United States Patent [19]

Shirley

[11] 4,396,099
[45] Aug. 2, 1983

[54] CONTROL SYSTEM FOR A CLUTCH
[75] Inventor: Ralph E. Shirley, Waterloo, Iowa
[73] Assignee: Deere & Company, Moline, Ill.
[21] Appl. No.: 241,871
[22] Filed: Mar. 9, 1981
[51] Int. Cl.³ .............................................. F16D 43/28
[52] U.S. Cl. .................................. 192/3.57; 192/99 S
[58] Field of Search ................... 192/3.57, 3.58, 3.55, 192/3.62, 3.63, 85 A, 85 AA, 3.51, 99 S; 74/878

[56] References Cited
U.S. PATENT DOCUMENTS

| 3,181,394 | 5/1965 | Ramsel et al. | 74/754 |
| 3,198,027 | 8/1965 | Ramsel et al. | 74/364 |
| 3,217,726 | 2/1963 | Rohweder et al. | 137/37 |
| 3,386,540 | 1/1966 | Horsch et al. | 192/9 |
| 3,468,194 | 9/1969 | Horsch et al. | 74/753 |
| 3,527,326 | 9/1970 | Griffen | 192/4 |
| 3,596,536 | 8/1971 | Starling | 74/753 |
| 3,633,440 | 1/1972 | Corrigan | 74/753 |
| 3,640,146 | 2/1972 | Barnes | 74/364 |
| 3,709,065 | 9/1973 | Starling | 74/753 |
| 3,863,523 | 2/1975 | Starling et al. | 74/754 |
| 4,111,071 | 9/1978 | Pearce et al. | 74/753 |
| 4,209,985 | 7/1980 | Master | 60/337 |

Primary Examiner—George H. Krizmanich

[57] ABSTRACT

A control system for a fluid activated clutch which includes a shut-off valve and a manually operable control lever connected to a control valve. A quantity of fluid retained in a fluid reservoir is pressurized by a pump and fluidly supplied to the clutch by fluid passages which interconnect the two valves. Movement of the control lever activates the control valve and allows pressurized fluid to control the position of the shut-off valve. After the fluid has been pressurized, the shut-off valve functions to prevent the clutch from being engaged by the pressurized fluid until the control lever has been depressed once and then released.

12 Claims, 6 Drawing Figures

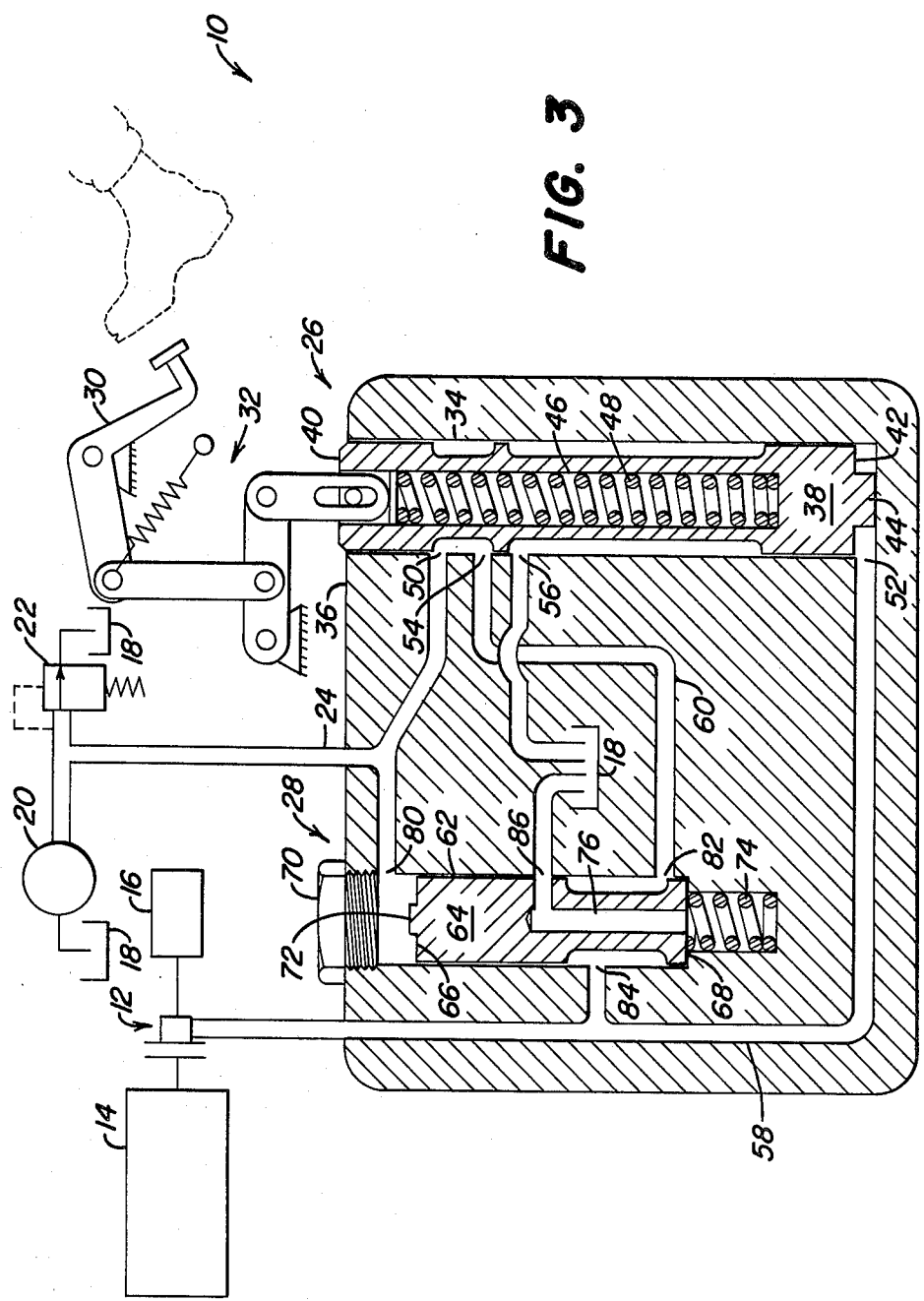

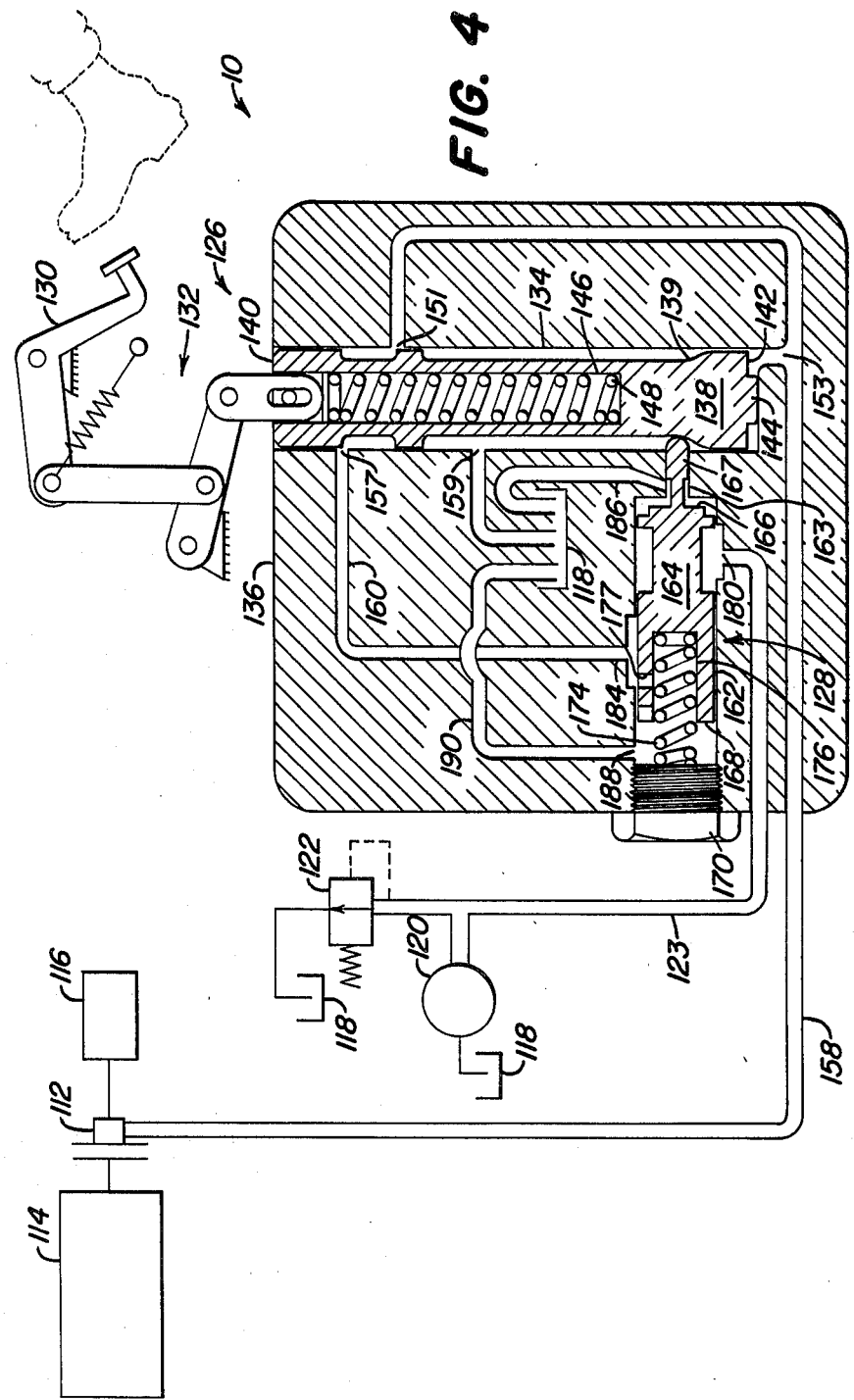

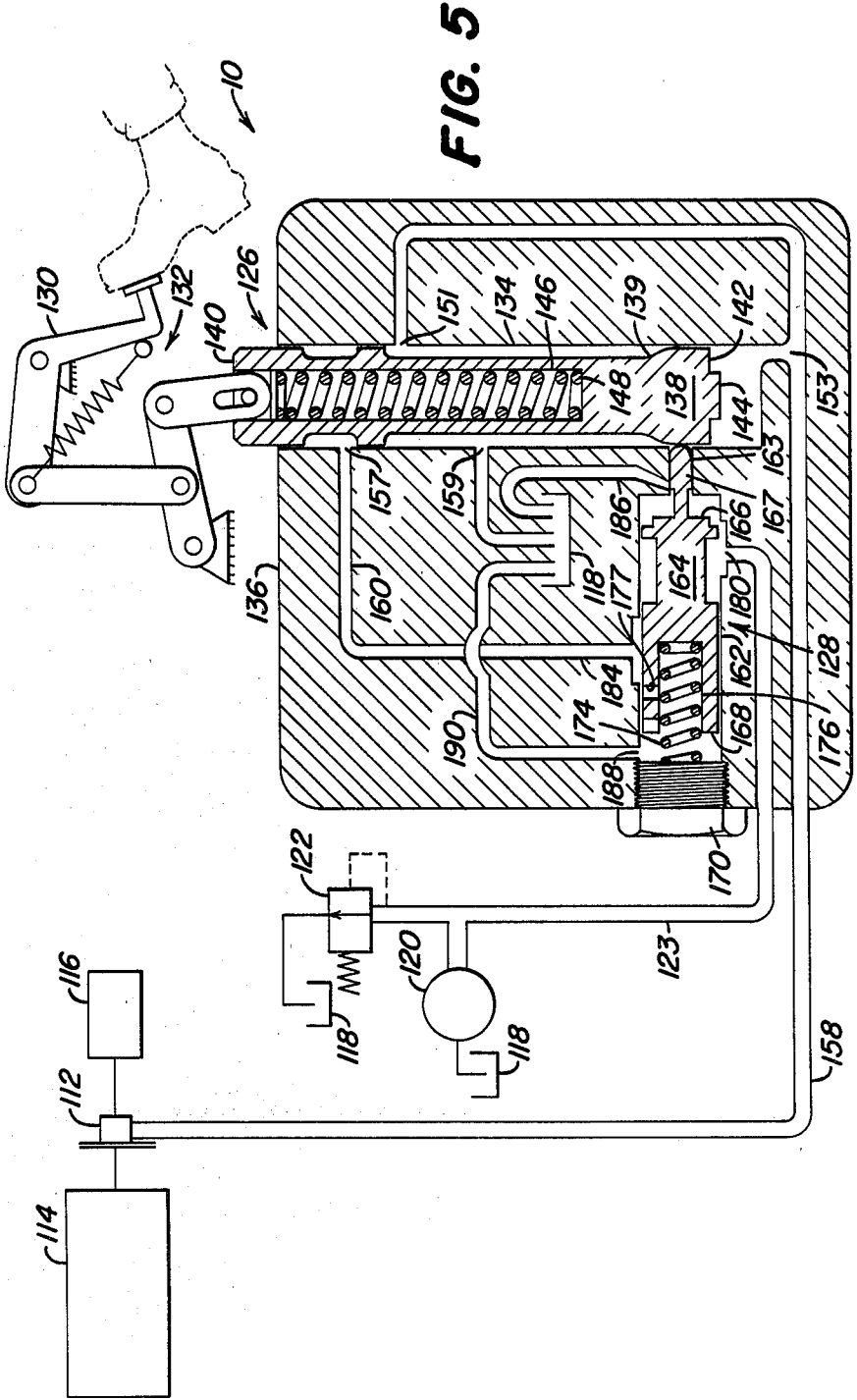

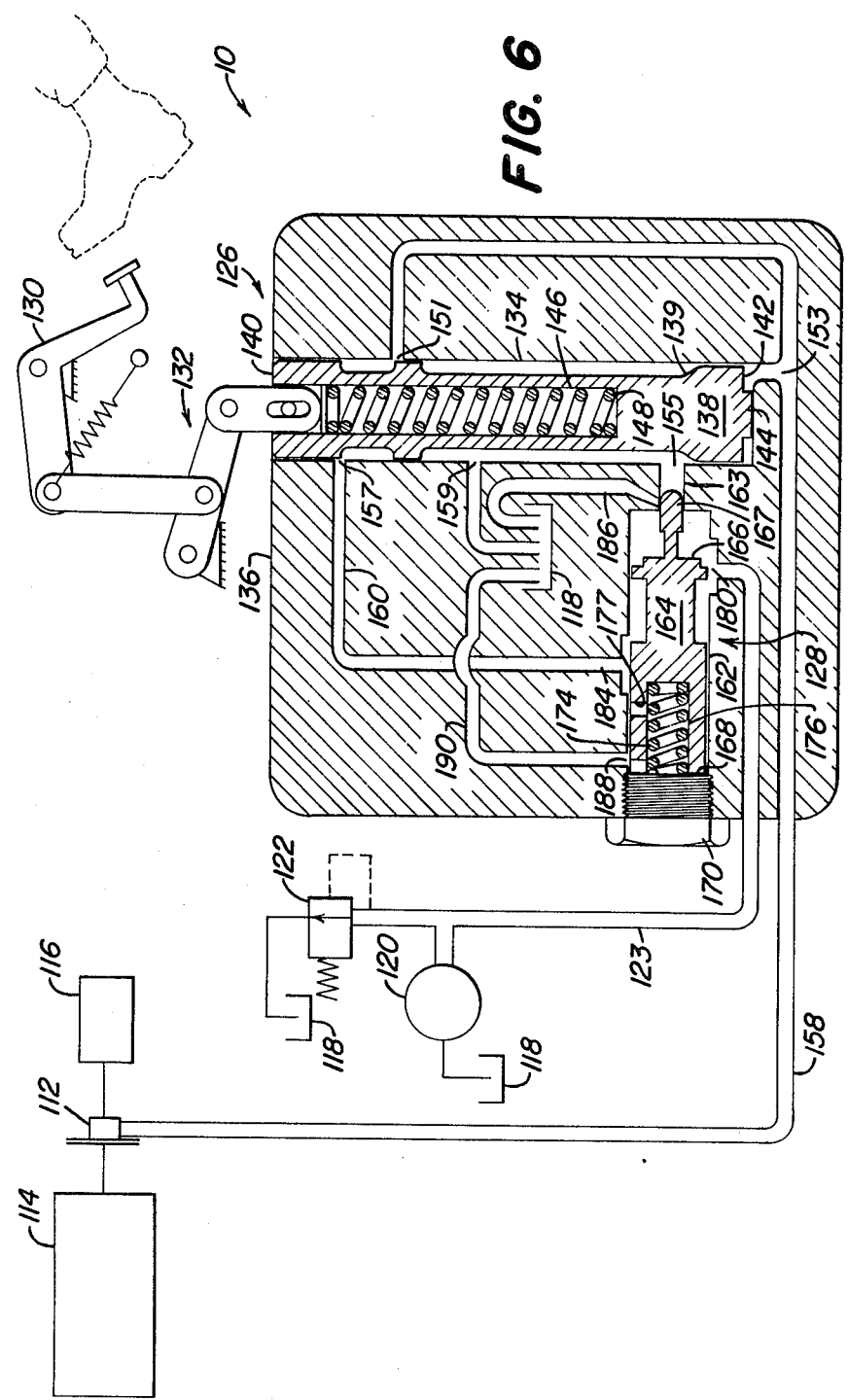

CONTROL SYSTEM FOR A CLUTCH

BACKGROUND OF THE INVENTION

1. Field of the Invention

This invention relates to a control system for a clutch and more particularly to a control system for a fluid activated clutch which utilizes a clutch oil shut-off valve.

2. Description of the Prior Art

Motorized vehicles and machinery, including those used in agricultural and industrial type equipment, have one or more clutches which are actuated by fluid pressure in order to transfer torque between the power source and the output. For safety reasons, a control system is often provided with an electric switch which requires selection of either a neutral or a park position before the vehicle or machinery can be started. The purpose of this switch is to prevent the vehicle or machinery from being started until the operator is in a safe position. However, the use of such electric switches makes it possible for an operator to short across the switch thus circumventing its usefulness. For example, if an operator jump-starts a vehicle, which has been left in gear, he may be tempted to bypass the neutral start switch and upon starting the engine, the vehicle will move either forward or in reverse. This unexpected movement could cause the vehicle to strike and possibly injure an unsuspecting person. In order to alleviate such occurrences, several hydraulically activated control systems have been devised which utilize multiple clutch activated valves which have to be activated before the vehicle can be driven. Two such patents in this area include U.S. Pat. No. 3,863,523 issued February 1975 to J. Starling et al and U.S. Pat. No. 3,468,194 issued September 1969 to J. Horsch et al. The Starling patent teaches a transmission control system having controls for engaging both speed ratio devices and directional devices. A safety valve is present which functions to insure that initially no fluid can be supplied from a fluid source to the speed ratio device unless the directional device control is in a neutral position. The safety valve shifts only after a build-up of pressure is present in the chosen speed ratio device. Such safety valve allows full pressure buildup in the speed ratio device and also allows full pressure to be supplied to the chosen directional drive device upon shifting of the directional drive control from the neutral position. The Horsch patent is just as complicated in its use of multiple valves. In this patent, a transmission control system is taught to control fluid pressure and fluid flow. The control system has speed selector valves for providing hydraulic fluid to selectively actuate speed and directional gear clutches and a pressure modulating valve for modulating pressure rise of the hydraulic fluid. A differential valve is present which has fluid pressure regulator means to provide fluid to the directional selector valve at a differentially constant lower pressure compared with main rail pressure. This differential valve includes a safety reset valve which prevents actuation of a directional gear clutch after a startup with the controls inadvertently out of neutral gear. The functional complexity and cost of these types of control systems has discouraged their implementation. Now a control system has been invented for a vehicle or a piece of machinery operational which requires activation of only one clutch.

SUMMARY OF THE INVENTION

Briefly, this invention relates to a control system for a fluid activated clutch. The control system includes a fluid reservoir, a pump, a control valve means, and a shut-off valve means. The control valve means is movable between a first and a second position by actuator means such as a clutch pedal. When the control valve is in the first position, it connects the pump or source of pressurized fluid to the clutch and when it is in the second position, it connects the reservoir to the clutch. The shut-off valve contains a biasing means for biasing the shut-off valve towards a first position blocking fluid flow from the source to the clutch and is responsive to an imbalance of fluid pressure impinging thereon to move to a second position which permits fluid flow between the source and the clutch.

The general object of this invention is to provide a control system for a fluid activated clutch which utilizes a shut-off valve for controlling the flow of a pressurized fluid to the clutch. A more specific object of this invention is to provide an internal control system for a clutch which is simple in construction.

Another object of this invention is to provide a control system for a fluid activated clutch utilized on a motorized vehicle or piece of machinery which will prevent the clutch from being engaged until the operator has depressed and then released a control lever.

Still another object of this invention is to provide a control system for a fluid activated clutch which uses a mechanically or hydraulically activated shut-off valve located between the source of pressurized fluid and the clutch.

Other objects and advantages of the present invention will become more apparent to those skilled in the art in view of the following description and the drawings.

BRIEF DESCRIPTION OF THE DRAWINGS

FIG. 3 is a partial sectional view of the control system of FIG. 1 with the engine running and the clutch engaged after initial clutch pedal motion to the disengaged position.

FIG. 4 is a partial sectional view of a control system for a fluid activated clutch having an alternatively designed shut-off valve for a motorized vehicle or piece of machinery showing the position of the valves after the engine has been started and before the clutch pedal is moved to the disengaged position.

FIG. 5 is a partial sectional view of the control system of FIG. 4 with the engine running and the clutch disengaged.

FIG. 6 is a partial sectional view of the control system of FIG. 4 with the engine running and the clutch engaged after initial clutch pedal motion to the disengaged position.

DETAILED DESCRIPTION OF THE PREFERRED EMBODIMENT

Referring to FIGS. 1-6, a control system 10 for a fluid activated clutch 12 is shown. The control system 10 can be employed in motorized vehicles or motorized pieces of machinery wherein a power source 14, such as an engine, supplies power to an output source 16, such as a transmission, via the clutch 12.

Figure 1:
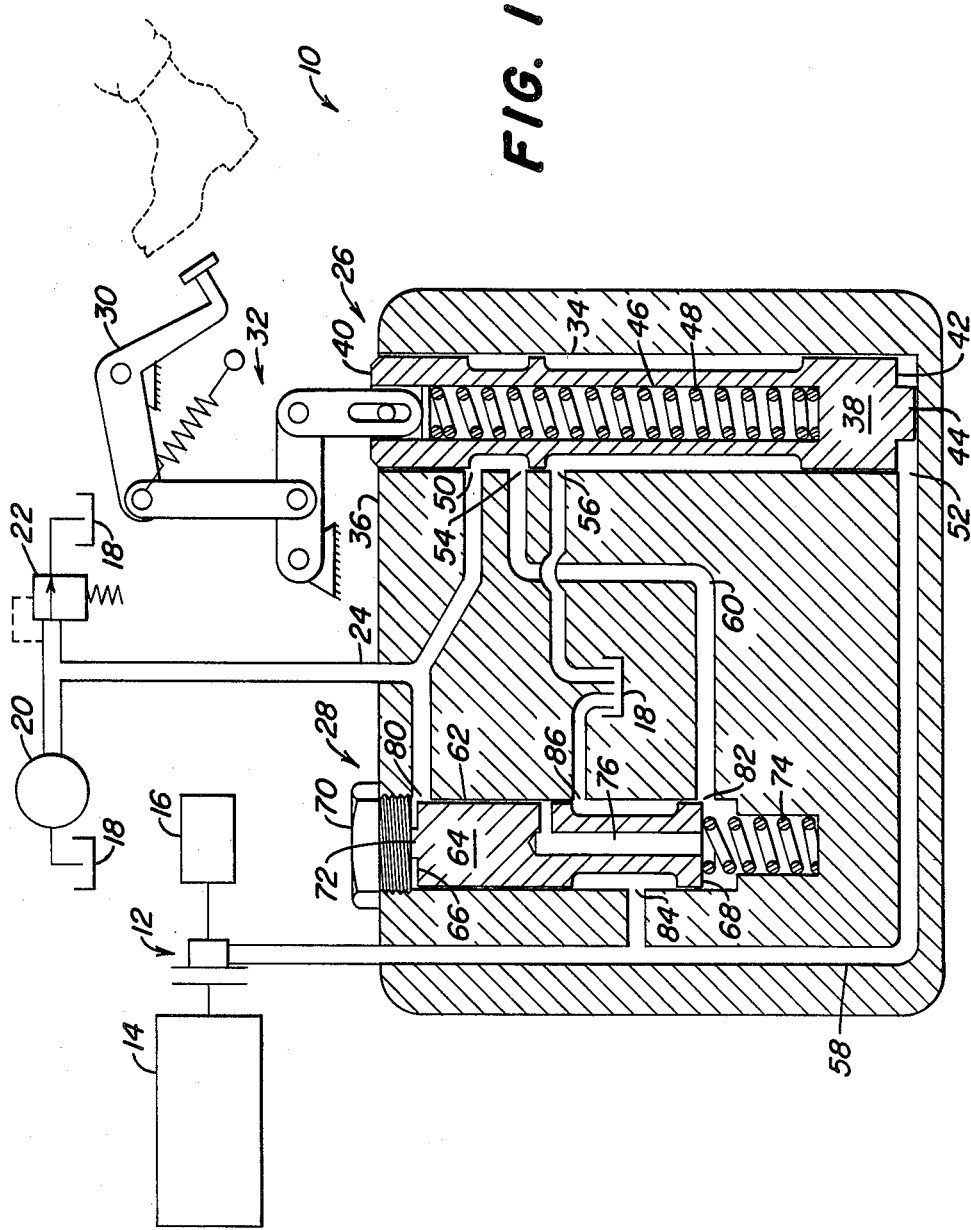
FIG. 1 is a partial sectional view of a control system for a fluid activated clutch having a hydraulically activated shut-off valve for a motorized vehicle or piece of machinery showing the position of the valves after the engine has been started but before the clutch pedal is moved to the disengaged position.
Figure 2:
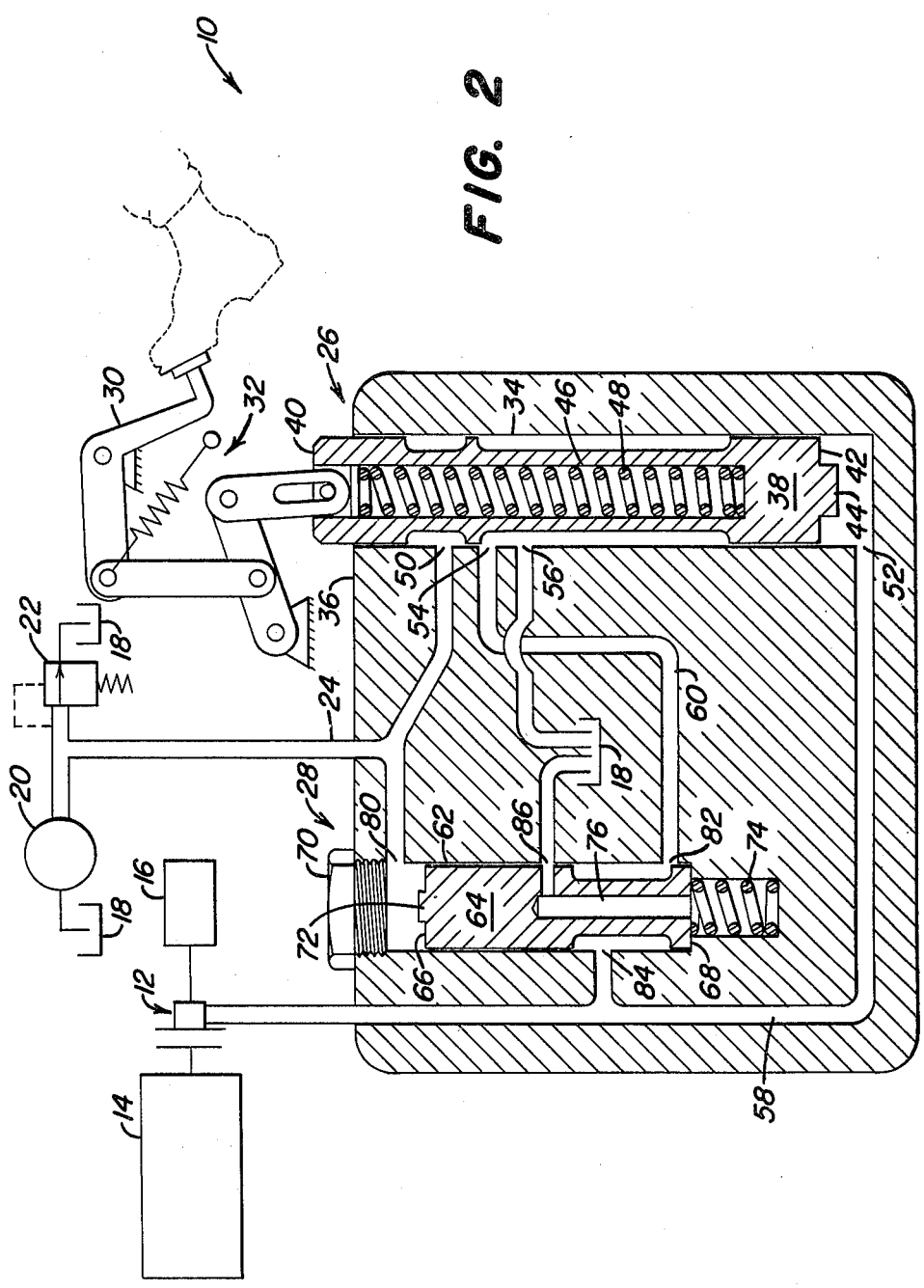
FIG. 2 is a partial sectional view of the control system of FIG. 1 with the engine running and the clutch disengaged.

Turning now to FIGS. 1-3, the control system 10 includes a fluid reservoir 18 connected to a pump 20 which is capable of pressurizing a fluid up to a predetermined pressure valve. Some of the pressurized fluid is then routed through a pressure relief valve 22 which serves to regulate the pressure to the control system 10 in order to maintain a desired system pressure and to prevent system damage. The fluid leaving the pressure relief valve 22 is dumped to the reservoir 18 while the remaining portion of the fluid from the pump 20 is directed through a fluid passage 24 to a control valve 26 and a shut-off valve 28. Both valves, 26 and 28 are positioned between the pump 20 and the clutch 12 and are interconnected to control fluid flow to or from the clutch 12.

The control valve 26 is manually activated by a control lever 30, such as a pedal, which is connected to the control valve 26 by a mechanical linkage 32. The exact configuration of the linkage 32 can vary depending upon the type or size of the apparatus on which the control system 10 is used. The control valve 26 includes a cylindrical bore 34 formed in a housing 36 which is open at one end. Movably positioned within the cylindrical bore 34 is a valve spool 38 which has a first end 40 and a second end 42. The first end 40 is exposed approximate the opening in the housing 36 while the second end 42, which contains an outwardly extending protrusion 44, is positioned adjacent to the inner end of the bore 34. Formed within the valve spool 38 is an elongated inner bore 46 which is also open at one end to the periphery of the housing 36 and is located adjacent to the first end 40. This inner bore 46 houses a biasing means 48, such as a compression spring, which is attached to the mechanical linkage 32. The biasing means 48 serves to modulate the fluid pressure to the clutch 12 as the control lever 30 is partially moved.

Located on the outer periphery of the valve spool 38 are a number of lands and grooves which serve to channel fluid flow through a plurality of ports which communicate with the cylindrical bore 34. The formation and positioning of such lands and grooves are well known to those skilled in the spool valve art.

The plurality of ports which communicate with the cylindrical bore 34 includes a first port 50, a second port 52, a function port 54 and a reservoir port 56. The first or inlet port 50 is located approximate the first end 40 of the valve spool 38 and serves to connect the fluid passage 24 to the control valve 26. The second port 52 is located adjacent to the second end 42 of the valve spool 38 and serves to connect the clutch 12 to the control valve 26 via a fluid passage 58. The fluid from the passage 58 impinges on the second end 42 of the control valve 26 and together with the spring 48 acts to modulate the movement of the valve spool 38 in the bore 34. This prevents abrupt or sudden changes in movement of the control valve 26.

The function port 54 is located between the first and second ports, 50 and 52 respectively, and is connected by a fluid passage 60 to the shut-off valve 28. And lastly, the reservoir port 56 is located between the function port 54 and the second port 52 and serves to connect the control valve 26 with the reservoir 18. The fluid flow in and out of these ports 50-56 will be explained shortly.

Also situated in the housing 36 is the shut-off valve 28 which includes a main bore 62 which is open at one end. Movably positioned within the main bore 62 is a valve spool 64 which has a first end 66 and a second end 68. The first end 66 is located approximate the open end in the housing 36 which is closed off by an end cap 70 once the valve spool 64 is inserted into the main bore 62. Located on the first end 66 is an outwardly extending protrusion 72 which serves to prevent a flush contact between the valve spool 64 and the inner surface of the end cap 70. The second end 68 of the valve spool 64 is positioned adjacent the closed end in the main bore 62 and is biased therefrom by biasing means 74, such as a compression spring. Formed within the valve spool 64 is an elongated fluid passageway 76 which is open to the second end 68 and which communicates with a distal point on the periphery of the valve spool 64. Just like the control valve spool 38, the shut-off valve spool 64 contains a number of lands and grooves formed in its outer periphery which serve to channel fluid flow through a plurality of ports which communicate with the main bore 62. These ports include a first port 80, a second port 82, a function port 84 and a reservoir port 86. The first port 80 is located approximate the first end 66 of the valve spool 64 and connects the fluid passage 24 to the shut-off valve 28. The second port 82 is located adjacent to the second end 68 of the valve spool 64 and is connected to the function port 54 of the control valve 26 by the fluid passage 60. The function port 84 of the shut-off valve 28 is located between the first and the second ports, 80 and 82 respectively, and intersects the fluid passage 58 which fluidly joins the clutch 12 to the second port 52 of the control valve 26. And lastly, the reservoir port 86 is located between the first port 80 and the function port 84 and serves to connect either the second end 68 or the function port 84 to the reservoir 18. The fluid flow through these ports will now be explained.

OPERATION

The control system 10 depicted in FIGS. 1-3 operates as follows: with the engine 14 started but before the control lever 30 has been initially moved or depressed, pressurized fluid from the pump 20 is directed through the fluid passage 24 to both the first port 50 of the control valve 26 and to the first port 80 of the shut-off valve 28. The pressurized fluid entering the first port 50 of the control valve 26 is routed out the function port 54 and through the fluid passage 60 to the second port 82 of the shut-off valve 28. The first and second ends, 66 and 68 respectively, of the shut-off valve 28, in combination with the walls of the bore 62 establish first and second servo chambers. The first servo chamber will be at the first end 66 and the second servo chamber will be at the second end 68. With both chambers pressurized, the fluid pressure forces on the spool 60 are neutralized. This neutral effect allows the spring 74 to retain the shut-off valve 28 in a first position wherein the protrusion 72, on the first end 66, abuts the inner surface of the end cap 70. In this position, the valve spool 64 will prevent fluid flow between the second port 82 and the function port 84. This means that no pressurized fluid can be routed to the clutch 12 and therefore the clutch 12 cannot be engaged. Without engaging the clutch 12, no power from the engine 14 can be transmitted to the transmission 16 and therefore the vehicle or piece of machinery will not move or operate.

Upon initial movement or depression of the control lever 30, as shown in FIG. 2, the mechanical linkage 32 will cause the control valve spool 38 to move upward within the cylindrical bore 34. This upward movement repositions the lands and grooves of the control valve spool 38 so that flow of pressurized fluid through the first port 50 is blocked. At the same time, the function port 54 is connected to the reservoir port 56 and any pressurized fluid within the second servo chamber of the shut-off valve 28 can be relieved to the reservoir 18. The draining of this pressurized fluid from the second servo chamber allows the pressurized fluid in the first servo chamber to overcome the force of the spring 74 and move the shut-off valve spool 64 downwardly. This downward movement opens up fluid communication between the function port 84 and the second port 82. This opening allows any fluid pressure present within the clutch 12, or the fluid passage 58 to be relieved to the reservoir 18 via the fluid passage 60, the control valve 26 and the reservoir port 56. It should be noted that as the shut-off valve spool 64 moves towards the second position, any trapped fluid in the second servo chamber will be allowed to flow out through the passageway 76 to the reservoir 18.

Turning now to FIG. 3, as the control lever 30 is released or returned to its original position, the valve spool 38 of the control valve 26 will move downward and again open up fluid flow between the first port 50 and the function port 54 and this allows pressurized fluid from the pump 20 to flow to the second port 82 of the shut-off valve 28. Since fluid from the pump 20 is still being directed to the first end 66 of the shut-off valve spool 64, the valve spool will remain in its second position wherein the spring 74 is compressed and fluid flow is open between the second port 82 and the function port 84. Thus the pressurized fluid passing through the shut-off valve 28 is directed to the clutch 12 and causes the clutch 12 to be engaged. Power can then be transmitted between the engines 14 and the transmission 16.

It should be noted that further depression of the control lever 30 will have no effect on the shut-off valve 28 so long as the engine 14 is running. Upon turning off the engine 14, the source of power to the pump 20 will be cut off and no more pressurized fluid will flow through the control system 10. This termination of pressurized fluid to the first end 66 of the shut-off valve spool 64 allows the force within the spring 74 to move the valve spool 64 back to its first position wherein fluid flow is again blocked between the second port 82 and the function port 84. Therefore, the control system 10 is returned to the position shown in FIG. 1.

The control system 10 is especially useful in preventing a vehicle from moving until the operator is in the operators station and is in control of the vehicle. This is accomplished by not allowing activation of the clutch 12 until the operator depresses the clutch pedal 30 and then releases it.

ALTERNATIVE EMBODIMENT

Referring now to FIGS. 4–6, an alternative configuration is shown for the valving of the control system 10. In this configuration, a fluid activated clutch 112 is again connected between an engine 114 and a transmission 116. The control system 10 includes a fluid reservoir 118, a pump 120, a relief valve 122 and a control valve 126 and a shut-off valve 128 contained within a housing 136. The control valve 126 includes a main bore 134 which is open to the exterior of the housing 136 at one end. Movably positioned within the main bore 134 is a valve spool 138 which has a first end 140 and a second end 142. The first end 140 is exposed approximate the opening in the housing 136 while the second end 142, which contains an outwardly extending protrusion 144, is positioned adjacent to the inner end of the bore 134. The protrusion 144 allows pressurized fluid to impinge on the second end 142 of the valve spool 138 when the valve spool 138 is abutting the inner end of the main bore 134. An inner bore 146, biasing means 148, a linkage 132 and a control lever 130 are also present and are similar in construction and function to those elements described in FIGS. 1–3. Located on the outer periphery of the valve spool 138 are a number of lands and grooves and an angularly shaped surface 139. The angularly shaped surface 139 is located close to the second end 142 and cooperates with the shut-off valve 128 in a unique manner which will be explained below. Associated with the main bore 134 are a plurality of fluid ports including a first port 151, a second port 153, a function port 157 and a reservoir port 159. The first port 151 is located approximate the first end 140 and is connected to the clutch 112 by a fluid passage 158. The second port 153 is located adjacent to the second end 142 of the control valve 126 and is also fluidly connected to the fluid passage 158. The function port 157 is located adjacent to the first end 140 and is connected by a fluid passage 160 to the shut-off valve 128. And lastly, the reservoir port 159 is located between the first and second ports, 151 and 153 respectively, and serves to connect the main bore 134 to the reservoir 118.

Also situated in the housing 136 is the shut-off valve 128 which includes a main bore 162 which communicates with the main bore 134 of the control valve 126 by a concentric bore 163. Movably positioned within the main bore 162 is a valve spool 164 which has a first end 166 and a second end 168. Attached to the first end 166 is a follower 167 which protrudes through the concentric bore 163 and abuts the angularly shaped surface 139 of the control valve 126 when the shut-off valve 128 is in a first position. The second end 168 of the shut-off valve 128 is located approximate an open end in the housing 136 and this opening is closed off by an end cap 170 once the valve spool 164 is inserted into the main bore 162. The second end 168 is biased away from the end cap 170 when the shut-off valve 128 is in its first position by a biasing means 174, such as a compression spring.

Formed within the valve spool 164 is a passageway 176 which is open to the second end 168 and which communicates with a distal point on the periphery of the valve spool 164 through a passage 177. Just like the shut-off valve 28 shown in FIGS. 1–3, the shut-off valve spool 164 contains a number of lands and grooves formed in its outer periphery which serve to channel fluid flow through a plurality of ports which communicate with the main bore 162. These ports include a first port 180, a function port 184, and first and second reservoir ports, 186 and 188 respectively. The first port 180 is located approximate the first end 166 of the valve spool 164 and is connected to the pump 120 by a fluid passage 123. The function port 184 is located between the first port 180 and the second end 168 and is connected to the function port 157 of the control valve 126 by the fluid passage 160. The first reservoir port 186 communicates with the concentric bore 163 and is normally open to the reservoir 118. And lastly, the second reservoir port 188 continually connects the second end 168 of the shut-off valve 128 to the reservoir 118 by a fluid passage 190. This second reservoir port 188 enables any trapped fluid which may be present in the passageway 176 to be relieved to the reservoir 118 so that the second end 168 of the valve spool 164 can abut the inner surface of the end cap 170.

The chamber area between the follower 167 and the first end 166 of the shut-off valve 128 is hereinafter referred to as first servo means and the chamber area between the second end 168 and the inner surface of the end cap 170 is hereinafter referred to as second servo means.

OPERATION

The control system 10 depicted in FIGS. 4–6 operates as follows: Starting with FIG. 4 wherein the engine 114 is started but before the control lever 130 has been initially moved or depressed, pressurized fluid from the pump 120 is directed through the fluid passage 123 to the first port 180 of the shut-off valve 128. Since the control valve 126 is in a down position with the protrusion 144 contacting the inner surface of the main bore 134, the shut-off valve spool 164 will be in its first position. In this first position, fluid flow is blocked between the first port 180 and the function port 184 and the follower 167 is contacting an upper portion of the angular slanted surface 139 of the control valve 126. The angular slanted surface 139 slants downward and outward to a larger diameter. With the control valve spool 138 in the down position, a fluid passage is open between the first port 151 and the function port 157. This passage allows any pressurized fluid which may be present in the clutch 112 or in the fluid passage 158 to be relieved to the reservoir 118 via the fluid passage 160, the passage 177, the passageway 176 and the fluid passage 190.

Upon initial movement or depression of the control lever 130, as shown in FIG. 5, the linkage 132 will cause the control valve spool 138 to move upward within the bore 134. This upward movement repositions the lands and grooves of the valve spool 138 within the main bore 134 and causes the passage between the first port 151 and the function port 157 to be blocked. At the same time, fluid passage is opened between the first port 151 and the reservoir port 159. Simultaneously, the follower 167 which is attached to the valve spool 164 of the shut-off valve 128 is moved inward or to the left by the angularly slanted surface 139 of the control valve 126. This leftward movement of the follower 167 and the valve spool 164 closes off the first reservoir port 186 and exposes the first servo means to the first port 180. This allows the pressurized fluid from the pump 120 via the passage 123 to impinge on the first end 166. This impinging action of the fluid forces the valve spool 164 farther to the left, compressing the spring 174 and opening up fluid communication between the first port 180 and the function port 184, as shown by the position of the valve spool 164 in FIG. 6. Although the fluid can now flow through the shut-off valve 128 and the passage 160, it will be blocked from passing to the clutch 112 by the control valve 126.

Turning now to FIG. 6, as the control lever 130 is released or returned to its original position, the valve spool 138 of the control valve 126 will move downward and again open up fluid flow between the first port 151 and the function port 157. This repositioning of the valve spool 138 allows pressurized fluid from the pump 120 to flow through the shut-off valve 128 and the control valve 126, via passages 160 and 158, to the clutch 112. The passage of this pressurized fluid to the clutch 112 causes the clutch 112 to be engaged and allows power to be transmitted from the engine 114 to the transmission 116.

It should be noted that further depression of the control lever 130 will have no effect on the shut-off valve 128 so long as the engine 114 is running. Upon turning off the engine 114, the source of power to the pump 120 will be cut off and no more pressurized fluid will be routed through the control system 10. The shut-off valve spool 164 will then be returned to its first position by the spring 174 and the control system 10 will be in the position shown in FIG. 4.

While the invention has been described in conjunction with two specific embodiments, it is to be understood that many alternatives, modifications and variations will be apparent to those skilled in the art in light of the aforegoing description. Accordingly this invention is intended to embrace all such alternatives, modifications and variations which fall within the spirit and scope of the appended claims.

I claim:

1. A control system for a fluid activated clutch, comprising:
   (a) a source of pressurized fluid;
   (b) a fluid reservoir;
   (c) control valve means movable between a first position which connects said source of pressurized fluid to said clutch and a second position which connects said reservoir to said clutch;
   (d) manual actuator means for controlling movement of said control valve means; and
   (e) shut-off valve means for controlling fluid flow between said source and said clutch, said shut-off valve means having biasing means for biasing said shut-off valve means towards a first position blocking fluid flow from said source to said clutch and being responsive to movement of said control valve means from said first position to said second position to move against said biasing means to a second position which permits fluid flow from said source to said clutch.

2. A control system for a fluid activated clutch, comprising:
   (a) a source of pressurized fluid;
   (b) a fluid reservoir;
   (c) control valve means movable between a first position which connects said source of pressurized fluid to said clutch and a second position which connects said reservoir to said clutch;
   (d) manual actuator means for controlling movement of said control valve means;
   (e) shut-off valve means for controlling fluid flow between said control valve means and said clutch, said shut-off valve means having biasing means for biasing said shut-off valve means towards a first position blocking fluid flow from said control valve means to said clutch and being movable to a second position which permits fluid flow from said control valve means to said clutch;
   (f) first servo means associated with said shut-off valve means responsive to fluid pressure from said source for urging said shut-off valve means towards said second position; and (g) second servo means associated with said shut-off valve means responsive to fluid pressure passing through said control valve means for urging and maintaining said shut-off valve towards and in said first position.

3. A control system for a fluid activated clutch, comprising:

(a) a source of pressurized fluid;
(b) a fluid reservoir;
(c) control valve means for controlling fluid flow between said source and said clutch, said control valve means including an inlet port, a function port, and a reservoir port all communicating with a main bore which retains a valving element movable between first and second positions, wherein said inlet port is connected to said function port and said function port is connected to said reservoir port, respectively;
(d) manual actuator means for controlling movement of said valving element;
(e) passage means for fluidly connecting said source of pressurized fluid to said inlet port, said reservoir to said reservoir port and said function port to said clutch;
(f) shut-off valve means interposed in said passage means between said function port and said clutch and movable between first and second positions blocking and permitting fluid flow, respectively, between said function port and said clutch;
(g) biasing means for urging said shut-off valve means towards said first position;
(h) first servo means associated with said shut-off valve means responsive to fluid pressure from said source for urging said shut-off valve means towards its second position;
(i) means for fluidly connecting said source of pressurized fluid to said first servo means;
(j) second servo means associated with said shut-off valve means responsive to fluid pressure passing through said control valve means for urging said shut-off valve means towards said first position; and
(k) means for providing fluid communication between said second servo means and said reservoir when said shut-off valve means is in said second position.

4. The control system of claim 3 wherein said shut-off valve means comprises:

(a) a valve body having a main bore with first and second ends; a first port, a second port, a function port and a reservoir port all communicating with said main bore, said first port of said shut-off valve connected to said source, said second port of said shut-off valve connected by said passage means to said function port of said control valve means, said reservoir port of said shut-off valve connected to said reservoir and said function port of said shut-off valve connected by said passage means to said clutch;
(b) a valve spool mounted in said main bore of said shut-off valve movable between first and second positions, wherein in said first position said first port of said shut-off valve is fluidly connected through said control valve means to said second end of said main bore of said shut-off valve and wherein fluid flow is blocked through said main bore of said shut-off valve between said second and function ports of said shut-off valve, and in said second position said first port of said shut-off valve is fluidly blocked by said control valve means from said second end of said main bore of said shut-off valve and fluid flow is permitted through said main bore of said shut-off valve between said second and function ports of said shut-off valve; and
(c) biasing means comprising a spring positioned between said second end of said main bore of said shut-off valve and said valve spool for biasing said valve spool towards its first position.

5. The control system of claim 4 wherein said valve spool contains an internal passageway which is open to said second end of said main bore of said shut-off valve and which connects to said reservoir port at a position remote from said second end of said main bore of said shut-off valve for providing fluid communication between said reservoir port of said shut-off valve and said second end of said main bore of said shut-off valve when said valve spool is in its second position.

6. A control system for a fluid activated clutch, comprising:

(a) a source of pressurized fluid;
(b) a fluid reservoir;
(c) control valve means movable between a first position which connects said source of pressurized fluid to said clutch and a second position which connects said reservoir to said clutch;
(d) manual actuator means for controlling movement of said control valve means;
(e) shut-off valve means for controlling fluid flow between said control valve means and said clutch, said shut-off valve means having biasing means for biasing said shut-off valve means towards a first position blocking fluid flow from said control valve means to said clutch and being responsive only to initial movement of said control valve means from said first position to said second position and then back to said first position each time said fluid is pressurized, which movement permits fluid flow from said source to said clutch;
(f) first servo means associated with said shut-off valve means responsive to fluid pressure from said source for urging said shut-off valve means towards said second position; and
(g) second servo means associated with said shut-off valve means responsive to fluid pressure passing through said control valve means for urging and maintaining said shut-off valve towards and in said first position.

7. A control system for a fluid activated clutch, comprising:

(a) a source of pressurized fluid;
(b) a fluid reservoir;
(c) control valve means movable between a first position which connects said source of pressurized fluid to said clutch and a second position which connects said reservoir to said clutch;
(d) manual actuator means for controlling movement of said control valve means;
(e) shut-off valve means movable between a first position blocking fluid flow from said source to said control valve means and a second position permitting fluid flow from said source to said control valve means, said shut-off valve means including follower means contacting a portion of the outer periphery of said control valve means for responding to movement of said control valve means from its first to its second position to move said shut-off valve means from its first towards its second position.

8. A control system for a fluid activated clutch, comprising:
(a) a source of pressurized fluid;
(b) a fluid reservoir;
(c) control valve means for controlling fluid flow between said source of pressurized fluid and said clutch, said control valve means including a first port, a function port and a reservoir port all communicating with a main bore which retains a valving element movable between first and second positions, wherein said first port is connected to said function port and said function port is connected to said reservoir port, respectively;
(d) manual actuator means for controlling movement of said control valve means;
(e) shut-off valve means for controlling fluid flow between said source of pressurized fluid and said control valve means, said shut-off valve means including biasing means for urging said shut-off valve means towards a first position blocking fluid flow from said source to said control valve means, and follower means for responding to movement of said control valve means from its first to its second position to move said shut-off valve means against said biasing means towards a second position which permits fluid flow to said control valve means; and
(f) first servo means associated with said shut-off valve means responsive to fluid pressure for assisting said follower means in urging said shut-off valve means towards its second position.

9. The control system of claim 8 wherein said shut-off valve means comprises:
(a) a valve body having a main bore with first and second ends, a first port, a function port, first and second reservoir ports and a concentric bore connecting said first end of said main bore of said shut-off valve to said main bore of said control valve means, said first port of said shut-off valve connected to said source, said function port of said shut-off valve connected to said function port of said control valve means, said first reservoir port of said shut-off valve connecting said concentric bore to said reservoir and said second reservoir port of said shut-off valve connecting said second end of said main bore of said shut-off valve to said reservoir;
(b) a valve spool mounted in said main bore of said shut-off valve movable between first and second positions, wherein in said first position fluid flow is blocked between said first port of said shut-off valve and said function port of said shut-off valve, and in said second position fluid flow is permitted between said first port of said shut-off valve and said function port of said shut-off valve; and
(c) biasing means comprising a spring positioned between said second end of said main bore of said shut-off valve and said valve spool for urging said valve spool towards its first position.

10. The control system of claim 9 wherein said valve spool of said shut-off valve contains an internal passageway which connects to said second reservoir port, for providing fluid communication between said function port of said shut-off valve and said second reservoir port when said valve spool of said shut-off valve is in said first position.

11. A control system for a fluid activated clutch, comprising:
(a) a source of pressurized fluid;
(b) a fluid reservoir;
(c) control valve means for controlling fluid flow between said source of pressurized fluid and said clutch, said control valve means including a first port, a function port and a reservoir port all communicating with a main bore which retains a valving element movable between first and second positions, wherein said first port is connected to said function port and said function port is connected to said reservoir port, respectively;
(d) manual actuator means for controlling movement of said control valve means;
(e) shut-off valve means for controlling fluid flow between said source and said clutch, said shut-off valve means having biasing means for biasing said shut-off valve means towards a first position blocking fluid flow from said source to said clutch and being responsive only to initial movement of said control valve means from said first control position to said second control position and then back to said first control position each time said fluid is pressurized, which movement permits fluid flow from said source to said clutch; and
(f) first servo means associated with said shut-off valve means responsive to fluid pressure from said source for urging said shut-off valve means towards its second position.

12. A control system for a fluid activated clutch, comprising:
(a) a source of pressurized fluid;
(b) a fluid reservoir;
(c) control valve means movable between a first position which connects said source of pressurized fluid to said clutch and a second position which connects said reservoir to said clutch;
(d) manual actuator means for controlling movement of said control valve means; and
(e) shut-off valve means for controlling fluid flow between said source and said clutch, said shut-off valve means having biasing means for biasing said shut-off valve means towards a first position blocking fluid flow from said source to said clutch and being responsive only to initial movement of said control valve means from said first position to said second position and then back to said first position each time said fluid is pressurized, which movement permits fluid flow from said source to said clutch.

* * * * *